3,366,605
AMIDE INTERPOLYMERIZATION IN ORGANIC SOLVENT USING $H_2O_2$

Jerome A. Seiner, Pittsburgh, Pa., assignor to Pittsburgh Plate Glass Company, Pittsburgh, Pa., a corporation of Pennsylvania
No Drawing. Filed June 10, 1964, Ser. No. 374,170
6 Claims. (Cl. 260—72)

This invention relates to interpolymers of unsaturated carboxylic acid amides and their preparation, and more particularly, to an improved method of interpolymerizing unsaturated amides with other ethylenically unsaturated monomers using hydrogen peroxide as a catalyst.

The outstanding properties of coating compositions containing interpolymers of unsaturated carboxylic acid amides has led to their large scale commercial acceptance. Such compositions and methods for their preparation are disclosed, for example, in United States Patent Nos. 2,870,116; 2,870,117; 2,940,945; 2,978,437; 3,037,963 and 3,079,434. These interpolymers are employed to produce clear films, or as resinous vehicles for enamels and other thermosetting compositions, and when employed in this manner provide tough, flexible, mar resistant films having excellent adhesion, chemical resistance, and other properties.

The amide interpolymers utilized in such compositions are ordinarily produced by interpolymerizing an unsaturated carboxylic acid amide and at least one other ethylenically unsaturated monomer in an organic solvent and in the presence of a catalyst. Organic peroxide catalysts and azo compounds have been employed for this purpose.

Azo compounds, such as alpha, alpha'-azobis-(isobutyronitrile), have been found to be quite effective and to give products with good properties, but such catalysts cause the reaction to be quite vigorous and difficult to control, even when relatively unreactive monomers are employed. When highly reactive monomers are included in the polymerization mixture, the reaction using azo type catalysts is so difficult to control as to become impracticable on a large scale. For example, the inclusion of acrylonitrile in the polymerization mixture, or the use of substantial amounts, e.g., 35 percent or more, of alkyl acrylates causes an exothermic reaction which is difficult to control. Similarly, polymerization mixtures in which relatively high levels of unsaturated amide, such as acrylamide, are present are also difficult to control, with an additional problem being the difficulty with which the final product is filtered in such cases when the reaction temperature has risen above the desired level.

Thus, azo type catalysts have not been employed to any large extent in commercial production of amide interpolymers. Large scale manufacture of these interpolymers has been carried out almost exclusively with the cumene hydroperoxide of commerce as the catalyst.

While cumene hydroperoxide and similar organic peroxide catalysts provide more controllable reactions, the process still must be carefully regulated, and with polymerization mixtures such as those above, problems of foaming, localized overheating, and excessive exotherms are encountered. In addition, relatively large amounts of these catalysts are often required to achieve high conversions.

Hydrogen peroxide has not been employed heretofore as a catalyst for the interpolymerization of unsaturated carboxylic acid amides. Although hydrogen peroxide has been used in some aqueous polymerization systems, its properties and the rate and manner in which it decomposes have apparently precluded its consideration for utilization as a catalyst in the nonaqueous interpolymerizations systems of the type described herein.

It has now been discovered that hydrogen peroxide is highly efficient as the catalyst for the interpolymerization of unsaturated amides with other unsaturated monomers in a nonaqueous, organic solvent medium, and is in fact substantially more effective than those catalysts which have been extensively used in the large scale practice of such processes. For example, hydrogen peroxide is from 5 to 10 times as effective as cumene hydroperoxide. In addition to its effectiveness, hydrogen peroxide provides an easily controllable reaction and unexpectedly improves both the properties of the resinous product of the interpolymerization and certain properties of the cured films made from the coating compositions employing these interpolymers.

The effectiveness and efficiency of hydrogen peroxide in these systems far surpasses that to be expected in view of its known properties. Because of this effectiveness, very low levels of the catalyst can be employed. Thus, as low as about 0.02 percent by weight, based upon the weight of the monomers in the polymerization mixture, can be used with beneficial results, and the preferred range is from about 0.1 percent to about 2 percent. This is substantially lower than the amount of other catalysts necessary to obtain comparable conversion. Higher amounts, e.g., 5 percent to 10 percent or higher, can also be used but are not substantially more effective and may cause difficulties in handling and other problems.

In addition to the foregoing advantages, hydrogen peroxide gives essentially complete conversion in relatively short reaction times, exhibits a uniform and mild exotherm during the polymerization, eliminates foaming and frothing of the reaction mixture, and provides polymers of greatly improved color with negligible catalyst residues remaining therein. Furthermore, the interpolymers obtained, when employed in place of similar interpolymers made with other catalysts in standard coating compositions, provide markedly improved film properties, such as better color after baking at high temperature and enhanced durability and weatherability.

The hydrogen peroxide is employed as obtained in commerce, in aqueous solution. While concentrated solutions can be used, e.g., 70 percent to 90 percent hydrogen peroxide, such highly concentrated solutions are difficult to handle and are not necessary in accordance with the present invention. Relatively dilute solutions, containing 20 percent to 50 percent by weight of hydrogen peroxide, produce good results and are often preferably employed, especially in larger scale production. If desired, the water added with the peroxide can be removed by azeotropic distillation or other means during the reaction.

The use of hydrogen peroxide as described herein is applicable to the production of the various amide interpolymers made by the addition polymerization of an unsaturated carboxylic acid amide and at least one other ethylenically unsaturated monomer. Among the amides which can be utilized are acrylamide, methacrylamide, itaconic acid diamide, alpha-ethyl acrylamide, crotonamide, maleamic acid and esters, maleuric acid and esters, and other amides of alpha, beta-ethylenically unsaturated carboxylic acids containing up to, for example, about 10 carbon atoms. An acrylamide is preferred, this term being utilized to include acrylamide, methacrylamide and similar alpha-substituted acrylic amides, and N-substituted acrylic amides, such as N-butoxymethyl acrylamide and N-butoxymethyl methacrylamide.

The monomer or monomers with which the amide is interpolymerized can be any ethylenic compound copolymerizable with the unsaturated amide, the polymerization taking place through the ethylenically unsaturated bonds. These include monoolefinic and diolefinic hydrocarbons, halogenated monoolefinic and diolefinic hydrocarbons, unsaturated esters of organic and inorganic acids, esters of unsaturated acids, nitriles, unsaturated acids, and the like. Among the comonomers often employed are methyl methacrylate, ethyl acrylate, styrene, vinyl toluene, acrylonitrile, methacrylic acid, 2-ethyl hexyl acrylate, butyl acrylate, butyl methacrylate, 2-hydroxyethyl methacrylate, and 2-hydroxypropyl methacrylate.

The interpolymer compositions described in the above-mentioned United States patents, for example, United States Patent No. 3,037,963, exemplify the type of amide interpolymers preferred for many purposes and to which the instant invention is applicable. The many unsaturated compounds disclosed in those patents illustrate the numerous monomers which can be interpolymerized with the amide in accordance with this invention.

The polymerization reaction can be carried out by admixing the amide, the other monomer or monomers, and the catalyst in an organic solvent, and refluxing the resulting solution for a time sufficient to obtain the desired conversion. A chain-modifying agent, such as a mercaptan, is often included in the polymerization mixture. The improved efficiency of hydrogen peroxide permits the polymerization reaction ordinarily to be complete in 8 hours or even less. In order to obtain the improved processing and other advantages described above, the temperature of the reaction mixture should be at least about 135° F. during the major part of the polymerization. Above this, any convenient temperature can be employed, a practical upper limit being about 350° F.; the preferred temperature range is between about 200° F. and about 300° F.

The reaction is carried out in an organic solvent in which the amide and the other monomers are soluble at reaction temperatures. It is usually necessary to have present at least some polar solvent, such as an alcohol, in order to dissolve the amide. Butanol or other lower alkanols, the Cellosolves and Carbitols, e.g. butyl Cellosolve and butyl Carbitol, are satisfactory for this purpose. Butyl or ethyl acetate or other ester solvents can also be included in the reaction medium, as can aliphatic and aromatic hydrocarbons, such as toluene, xylene, naphthas, and the like. Ketones may also be utilized, for instance, methyl ethyl ketone. Generally, mixtures of solvents are used and the mixture is chosen so as to reflux at the desired temperature of operation.

In many cases, the interpolymer produced from the amide and the other monomer or monomers is further reacted with an aldehyde to replace amido hydrogen atoms with an alkylol group. Still further reaction with an alcohol produces etherification of the alkylol groups. After this further reaction, the modified interpolymer is characterized by having amido hydrogen atoms replaced by the structure:

where R is hydrogen or an alkyl radical, dependent upon the nature of the aldehyde employed, and $R_1$ is hydrogen or an alkyl or other organic radical, depending upon whether etherification of the alkylol groups is carried out and if so, the nature of the etherifying alcohol. Generally, one hydrogen atom per amido group is replaced, but it is possible to replace both.

Alternatively, these modified interpolymers can be produced by interpolymerizing an aldehyde-modified unsaturated amide, such as an N-alkylol amide, which may be then etherified, if desired, or by employing an N-alkoxyalkyl amide. Such polymerizations are also effectively catalyzed by hydrogen peroxide.

In order to prevent possible problems of storage stability and premature gelation, and to obtain optimum resin and film properties, it is desirable that at least part, and in many cases at least about half, of the alkylol groups of the aldehyde-modified amide interpolymer be etherified, so that all or part, and preferably at least about 50 percent, of the amido groups have a hydrogen atom replaced by an alkoxyalkyl group. The aldehyde-modification is preferably carried out with formaldehyde or with a formaldehyde-releasing agent, such as paraformaldehyde, although other aldehydes, such as acetaldehyde, butyraldehyde, and the like, can be used. Butanol is a preferred alcohol for use in the etherification, although other monohydric alcohols, such as methanol, ethanol, propanol, hexanol, and other alkanols containing up to about 20 carbon atoms, may also be employed; as may aromatic alcohols, such as benzyl alcohol; cyclic alcohols, such as cyclohexanol; the monoethers of glycols, such as butyl Cellosolve (ethylene monobutyl ether) and other Cellosolves and Carbitols; or substituted alcohols, such as 3-chloropropanol.

The aldehyde-modifying and etherifying reaction is generally carried out by reacting the amide interpolymer with the aldehyde and alcohol, often in the presence of a mild acid catalyst, such as maleic anhydride, while removing the water of condensation. The above-mentioned patents describe this modifying reaction in further detail.

Because of the outstanding properties of the aldehyde-modified and etherified amide interpolymers, the improved process for the interpolymerization reaction as described herein is uniquely valuable when the polymerization reaction is part of the preparation of such interpolymers. However, it will be understood that the interpolymerizations catalyzed by hydrogen peroxide can be utilized whether or not the resultant interpolymer is modified with an aldehyde and an alcohol.

While the advantages of the instant invention are generally applicable to the preparatioin of amide interpolymers of the class described using any of the various monomers mentioned, it has been found that these catalysts provide even greater advantages by solving certain problems encountered with several specific monomer systems. Thus, for example, the use of acrylonitrile as a comonomer with the unsaturated amide, even in quantities as low as 3 percent by weight or even lower, results in a difficult to control reaction. The present catalysts, however, provide an easily controlled polymerization without the difficulties normally encountered. The typical monomer system of this type, with which the catalysts herein are especially useful, contains from about 2 percent to about 25 percent of an acrylamide, from about 3 percent to about 30 percent of acrylonitrile, and at least one other monomer.

Another reaction system in which problems including excessive forming and difficult control have been encountered, involves the use of substantial amounts of alkyl acrylates along with the unsaturated amide. In this case also, the present catalysts provide easily controlled reaction and overcome the difficulties normally associated with the polymerization of such mixtures. These particular advantages are attained particularly in those systems wherein there are present from about 2 percent to about 25 percent of an acrylamide and at least about 35 percent of an alkyl acrylate, such as ethyl acrylate, butyl acrylate, 2-ethyl hexyl acrylate, and other alkyl acrylates having up to about 12 carbon atoms in the alkyl group, along with sufficient other monomer or monomers to make 100 percent, i.e, up to about 63 percent.

Presumably, some of the advantages resulting from the use of hydrogen peroxide are at least in part due to the particular type of groups which terminate the polymer chains when this catalyst is utilized. The exact nature of these end groups and the manner in which they terminate the chains is not known with certainty, and thus the exact composition of the products which are achieved and which give the improved properties cannot be set forth. However, these properties are especially valuable in coatings produced from the interpolymers manufactured in this manner, and in many instances provide uses which were not heretofore available with these products. They are especially found with aldehyde-modified and etherified amide interpolymers as described above.

Except for the hydrogen peroxide catalyst and the shorter reaction time which it affords, the production of amide interpolymers in accordance with this inventioin is carried out in the manner well known in the art. In a typical procedure, the reactive monomers and solvent are charged into a reaction vessel along with a portion of the catalyst and sometimes a small amount (e.g., 0.5 percent to 3 percent, based on the weight of monomers) of a chain-modifying agent, such as tertiary-dodecyl mercaptan. This mixture is heated, usually to reflux, although in some cases the temperature during the major part of the polymerization reaction is held somewhat below reflux. It is desirable in many cases to add the catalyst incrementally during the reaction.

If modification of the interpolymer with an aldehyde and an alcohol is to be effected, they are usually added toward the end of the reaction period, along with, in many cases, maleic anhydride or a similar mild acid catalyst and additional solvent. The evolved water is usually removed by azeotropic distillation. If desired, the further reaction can be carried out with aldehyde alone. Also, the aldehyde or the aldehyde and alcohol can be added earlier during the polymerization (even with the initial charge) or the interpolymer can be used without such modification, or the modifying reaction can be carried out later as a separate step.

To illustrate the process of the invention, there are described below several examples in detail.

EXAMPLE 1

A reaction vessel was charged with the following:

| | Parts by weight |
|---|---|
| Acrylamide | 75 |
| Styrene | 412.5 |
| Methacrylic acid | 37.5 |
| Ethyl acrylate | 975 |
| Tertiary-dodecyl mercaptan | 15 |
| Butanol | 375 |
| High boiling aromatic naphtha (Solvesso 150) | 375 |
| Hydroxygen peroxide (50 percent aqueous solution) | 1.88 |

This mixture was heated to reflux and maintained at about 230° F. for 15 minutes. There was then added over a 15-minute period, a mixture of 1.88 parts of the hydrogen peroxide solution and 20 parts of Solvesso 150. Refluxing was continued for 45 minutes. This procedure, with similar catalyst and solvent additions every 45 minutes, was repeated seven more times, after which there was added a mixture of 159 parts of butyl Formcel (approximately 40 percent formaldeyhde in butanol), 2 parts of maleic anhydride, 170 parts of Solvesso 150, and 1.88 parts of hydrogen peroxide solution. The reaction mixture was refluxed for 3 hours while removing water azeotropically, a total of 46 parts of water being removed. After cooling, there were added 420 parts of Solvesso 150, whereupon the product mixture had a solids content of 50.3 percent and a Gardner-Holdt viscosity of W.

EXAMPLE 2

A reaction was charged with the following:

| | Parts by weight |
|---|---|
| Acrylamide | 150 |
| Styrene | 375 |
| Ethyl acrylate | 660 |
| Methacrylic acid | 37.5 |
| Acrylonitrile | 277.5 |
| Tertiary-dodecyl mercaptan | 41.25 |
| Butanol | 375 |
| Xylene | 375 |
| Hydrogen peroxide (70 percent aqueous solution) | 3.74 |

This mixture was heated to reflux and after 2 hours there were added 3.74 parts of hydrogen peroxide solution and 20 parts of Solvesso 150. The mixture was maintained at about 210° F. to 215° F. for 2 hours and then there were added 1.88 parts of hydrogen peroxide solution, 318 parts of butyl Formcel, 4 parts of maleic anhydride, and 230 parts of Solvesso 150. The reaction mixture was refluxed for a total of 6 hours while azeotropically removing water, with additions of 0.94 part of hydrogen peroxide solution and 20 parts of Solvesso 150 being made after each of the first 4 hours. A total of 72 parts of water were removed. At the end of the reaction, there were added 92.5 parts of butanol, 92.5 parts of xylene, and 605 parts of Solvesso 150. The product mixture had a solids content of 38.2 percent and a Gardner-Holdt viscosity of T to U.

EXAMPLE 3

The following mixture was charged into a reaction vessel:

| | Parts by weight |
|---|---|
| Acrylamide | 150 |
| Hydroxyethyl methacrylate | 75 |
| Methacrylic acid | 37.5 |
| Methylmethacrylate | 260 |
| Styrene | 577.5 |
| 2-ethyl hexyl acrylate | 300 |
| Tertiary-dodecyl mercaptan | 22.5 |
| Butanol | 750 |
| Xylene | 670 |
| Hydrogen peroxide (70 percent aqueous solution) | 3.0 |

The mixture was heated to reflux and after 2 hours, 3 parts of hydrogen peroxide solution and 20 parts of xylene were added. Refluxing was continued for a total of 6 hours, with the addition of 1.5 parts of hydrogen peroxide solution and 20 parts of xylene after each of the second, fourth and sixth hours. With the final catalyst addition there were added 318 parts of butyl Formcel and 4 parts of maleic anhydride. Refluxing was again continued for 3 hours while removing water azeotrocipally, with a total of 70 parts of water being removed. The product mixture had a solids content of 46.3 percent and a Gardner-Holdt viscosity of W.

As will be noted, very low levels of catalyst and short reaction periods were employed in the above example, yet in all cases essentially complete conversion of monomers was attained. For comparison, the process of Example 1 resulted in essentially complete reaction in 9½ hours, but the same reaction with a comparable level of cumene hydroperoxide as the catalyst did not produce as high a conversion even after 21 hours.

Further, the above reactions were all smooth and easily controlled, with no foaming, and there was either no noticeable exotherm or a very uniform and mild exotherm. The color of the product in each case was excellent.

The above examples also illustrate the manner in which the instant invention overcomes a number of troublesome problems in the production of amide interpolymers. For instance, the monomer composition of Example 2 with cumene hydroperoxide as the catalyst results in a large exotherm with excessive foaming. This problem is accentuated using azo catalysts, such as alpha, alpha'-azobis-(isobutyronitrile); such polymerizations are often dangerous and react with almost explosive violence. Using hydrogen peroxide, however, no such problems are encountered.

Comparable results are attained when various other monomers as described above are substituted for those employed in the interpolymers of the above examples. For instance, methacrylamide can be used in place of acrylamide, and other compounds having a polymerizable ethylenic group can be substituted for all or part of the other monomers. As disclosed in the art, the specific properties of the amide interpolymers and coatings made therefrom can be controlled to a large extent by the proper choice of monomers. The catalyst of this invention is applicable to all these monomer systems and provides distinct advatages in their production.

In addition to the above processing and resin advantages, coating compositions formulated from interpolymers as produced by the herein-described method have all the outstanding properties for which this class of coatings is noted. These include excellent fabrication properties, hardness, chemical resistance, and the like. In addition, these compositions exhibit improvement in certain properties which are important in particular uses, such as initial color, color on over-bake, anti-blocking properties, and durability. Coating compositions are formulated from these products with conventional pigments, fillers, additives, and other resins, in the manner known to the art.

According to the provisions of the patent statutes, there are described above the invention and what they are now considered to be its best embodiments. However, within the scope of the appended claims, it is to be understood that the invention can be practiced otherwise than as specifically described.

I claim:

1. In the method of producing an amide interpolymer which comprises interpolymerizing an organic solvent solution of a mixture of monomers comprising from about 2 to about 25 percent by weight of an amide of an ethylenically unsaturated carboxylic acid containing up to about 10 carbon atoms and at least one other ethylenically unsaturated monomer copolymerizable therewith, the improvement which comprises carrying out the interpolymerization reaction in the presence of at least about 0.02 percent by weight, based upon the total monomers, of hydrogen peroxide.

2. The improvement of claim 1 in which the amount of hydrogen peroxide is from about 0.1 percent to about 2 percent by weight based upon the total monomers.

3. The improvement of claim 1 in which said mixture of monomers comprises from about 2 percent to about 25 percent by weight of an acrylamide, from about 3 percent to about 30 percent by weight of acrylonitrile, and at least one other ethylenically unsaturated monomer.

4. The improvement of claim 1 in which said mixture of monomers comprises from about 2 to about 25 percent by weight of an acrylamide and at least about 35 percent by weight of an alkyl acrylate.

5. In the method of producing an amine interpolymer which comprises interpolymerizing an organic solvent solution of a mixture of monomers comprising from about 2 to about 25 percent by weight of an amide of an ethylenically-unsaturated carboxylic acid containing up to about 10 carbon atoms and at least one other ethylenically-unsaturated monomer copolymerizable therewith, and reacting the amido groups of the resulting interpolymer with an aldehyde and an alcohol, the improvement which comprises carrying out the interpolymerization reaction in the presence of at least about 0.02 percent by weight, based upon the total monomers, of hydrogen peroxide.

6. The improvement of claim 5 in which the amount of hydrogen peroxide is from about 0.1 percent to about 2 percent by weight, based upon the total monomers.

References Cited

UNITED STATES PATENTS

| | | | |
|---|---|---|---|
| 2,680,110 | 6/1954 | Loughran et al. | 260—80.5 |
| 1,933,052 | 10/1933 | Fikentscher et al. | 260—17 X |
| 3,037,963 | 6/1962 | Christenson | 260—80.5 |

JOSEPH L. SCHOFER, *Primary Examiner.*

W. HOOVER, S. M. LEVIN, *Assistant Examiners.*